United States Patent [19]
Perlberg

[11] 3,787,083
[45] Jan. 22, 1974

[54] SAFETY VEHICLE BUMPER
[75] Inventor: Jack Perlberg, Forest Hills, N.Y.
[73] Assignee: The Raymond Lee Organization, Inc., New York, N.Y.; a part interest
[22] Filed: June 6, 1972
[21] Appl. No.: 260,322

[52] U.S. Cl. .................. 293/88, 293/71 R, 267/140
[51] Int. Cl. ............................................ B60r 19/08
[58] Field of Search ........ 293/1, 70, 72, 71 R, 71 P, 293/88, 89; 267/139, 140; 5/337; 114/219

[56] References Cited
UNITED STATES PATENTS

| 3,666,310 | 5/1972 | Burgess et al. | 293/71 R |
| 2,837,145 | 6/1958 | Goetz | 5/337 |
| 3,493,257 | 2/1970 | Fitzgerald et al. | 293/71 R |
| 3,230,675 | 1/1966 | Frommelt et al. | 293/71 R |
| 3,411,304 | 11/1968 | Miller | 293/71 R |

Primary Examiner—Gerald M. Forlenza
Assistant Examiner—Robert Saifer
Attorney, Agent, or Firm—Howard I. Podell

[57] ABSTRACT

A safety bumper for automotive vehicles with energy absorption properties to minimize the shock of collision. The bumper consists of a metal facing which is backed by blocks of foamed plastic, such as polyurethane, encased in porous plastic or fabric sheeting. For installation, on the front and on the rear of existing automobiles, the present metal bumper is retained as the metal facing, and the plastic foam formed in place, or affixed by means of adhesive to fill the space between the existing bumper and the front or the rear of the automobile body.

1 Claim, 3 Drawing Figures

PATENTED JAN 22 1974    3,787,083
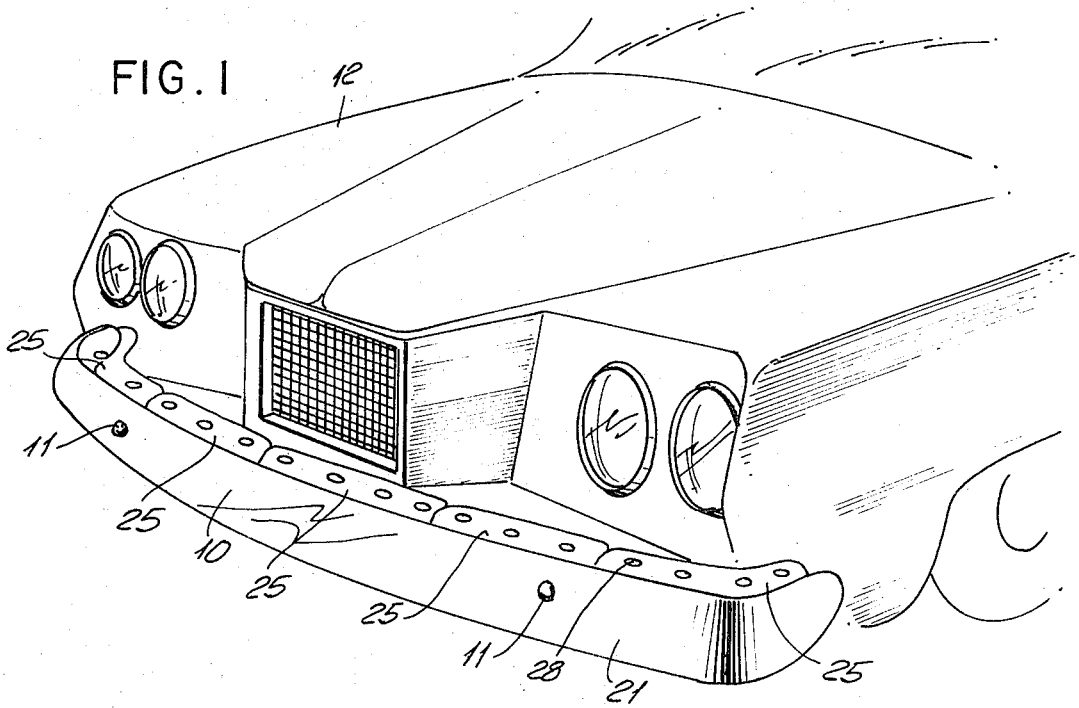
FIG. 1
FIG. 2
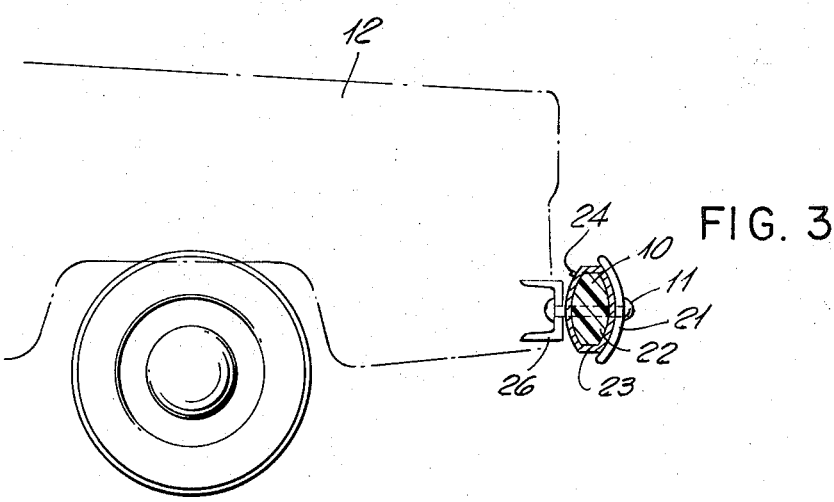
FIG. 3

SAFETY VEHICLE BUMPER

SUMMARY OF THE INVENTION

This invention relates to an automobile bumper for use on the front and on the rear of an automobile with shock absorbing properties to reduce or eliminate the damage involved in automobile collision.

An advantage of this invention is it may be incorporated in place on the front or on the rear of an automobile utilizing the existing conventional automobile bumper, with consequent improvement of the shock absorbing properties of the automobile front end and rear end.

The invention consists of an automobile bumper for the front or for rear of an automobile, with an external metal facing, with encased blocks of foamed plastic or latex affixed between the external metal facing and the automobile body. The plastic foam or latex may be formed in place or affixed by adhesive and is encased in porous plastic or fabric sheeting. The encasing sheeting preferably has the appearance of leatherette with air holes located in the sheeting utilizing various size grommetted holes.

BRIEF DESCRIPTION OF THE DRAWING

The objects and features of the invention may be understood with reference to the following detailed description of an illustrative embodiment of the invention, taken together with the accompanying drawing in which:

FIG. 1 is a perspective view of the safety vehicle bumper fastened to the front of an automobile;

FIG. 2 is a plan cross-section of the bumper fastened to the front of an automobile; and FIG. 3 is a side cross-section of the bumper fastened to the front of an automobile.

DESCRIPTION OF THE PREFERRED EMBODIMENT

Turning now descriptively to the drawing, in which similar reference characters denote similar elements throughout the several views, FIGS. 1–3 illustrate the shock absorbent vehicle bumper 10 of this invention fastened by bolts 11 to the forward frame 26 of automobile 12.

The bumper consists of an external metal facing 21 which may be of the conventional metal bumper type, backed with cartridges 25 of blocks 22 foamed plastic or latex contained in a fabric or plastic casing 23. The fabric casing 23 may be closed over foamed plastic or latex blocks 22 by means of a zipper 24 in the casing, or the plastic or latex may be foamed in place in the casing. Air holes 28, in the plastic casing 23 enclosing the blocks 22 of foam plastic or latex permit breathing of the plastic and escape of air during the compression of the plastic or latex blocks in a collision.

Although the illustrations FIG. 1–3 depict the bumper 10 installed on the front of the vehicle, the bumper 10 is equally useful in minimizing collision damage when installed on the rear of the vehicle.

Since obvious changes may be made in the specific embodiment of the invention described herein, it is indicated that all matter contained herein is intended as illustrative and not as limiting in scope.

Having thus described my invention, what I claim as new and desire to secure by Letters Patent of the United States is:

1. A replaceable shock absorbent bumper for the protection of an automotive vehicle from the effects of longitudinal collision, consisting of an external metal facing which is fastened to the frame of the vehicle, externally of the vehicle frame, with encased blocks of foamed plastic material or foamed latex mounted between the said external metal facing and the frame of the vehicle, in which the foamed plastic or foamed latex is in the form of individual blocks encased in a container of plastic sheeting, with the said container of plastic sheeting fitted with a zipper type fastener for removing and replacing a foamed plastic or latex blocks, as required, said plastic sheeting of the said container being fitted with air holes to provide venting of all surfaces of the encased foam material.

* * * * *